United States Patent [19]

Ireton et al.

[11] Patent Number: 5,255,105
[45] Date of Patent: Oct. 19, 1993

[54] ENCODING IMAGE DATA

[75] Inventors: Mark A. Ireton, Manchester; Costas S. Xydeas, Wilmslow, both of United Kingdom

[73] Assignee: International Computers Limited, London, United Kingdom

[21] Appl. No.: 51,571

[22] Filed: Apr. 22, 1993

Related U.S. Application Data

[63] Continuation of Ser. No. 659,020, Feb. 21, 1991.

[30] Foreign Application Priority Data

Mar. 17, 1990 [GB] United Kingdom ............... 9006080

[51] Int. Cl.$^5$ .............................................. H04N 1/41
[52] U.S. Cl. .................................. 358/426; 358/430; 358/261.2
[58] Field of Search ............... 358/426, 430, 447, 470, 358/261.2

[56] References Cited

U.S. PATENT DOCUMENTS

| | | | |
|---|---|---|---|
| 4,675,743 | 6/1987 | Riseman et al. | 358/470 |
| 4,677,571 | 6/1987 | Riceman et al. | 358/470 |
| 4,873,577 | 10/1989 | Chamzas | 358/447 |
| 4,969,204 | 11/1990 | Melnychuck et al. | 358/426 |
| 4,979,049 | 12/1990 | Chamzas et al. | 358/426 |
| 5,031,053 | 7/1991 | Chamzas et al. | 358/426 |
| 5,048,111 | 9/1991 | Jones et al. | 358/426 |
| 5,050,230 | 9/1991 | Jones et al. | 358/426 |

FOREIGN PATENT DOCUMENTS

| | | |
|---|---|---|
| 0220706 | 5/1987 | European Pat. Off. . |
| 0376679 | 7/1990 | European Pat. Off. . |
| 2199460 | 7/1988 | United Kingdom . |

Primary Examiner—Edward L. Coles, Sr.
Assistant Examiner—Thomas L. Stoll
Attorney, Agent, or Firm—Lee, Mann, Smith, McWilliams, Sweeney & Ohlson

[57] ABSTRACT

A method is described for encoding a first image to produce a second, lower resolution image. For each superpixel group in the first image, a prediction class is formed, based on the values of the pixels in two adjacent superpixels. This prediction class is used to access a table, to obtain a prediction for the corresponding pixel in the second image. If the prediction matches the actual pixel pattern of the superpixel, the corresponding pixel in the second image is set to the predicted colour. If the prediction does not match, then the corresponding pixel in the second image is set to the inverse of the predicted colour, and the actual pixel pattern is stored in a supplementary file. If no prediction is provided, the actual pixel pattern is stored, and the pixel in the second image is set to the colour of the majority of the pixels in the superpixel. The result is a compressed, low-resolution image, along with a supplementary file containing the information necessary to reconstruct the high-resolution image from the low-resolution image. The method may be applied repeatedly so as to form a series of images of progressively lower resolution.

6 Claims, 2 Drawing Sheets

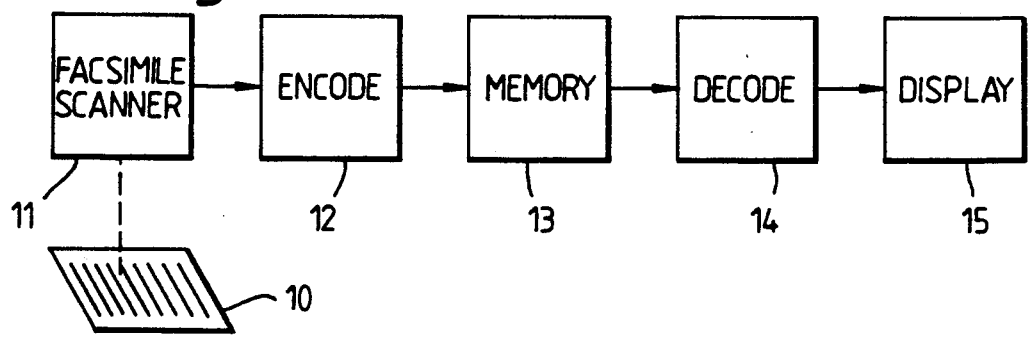
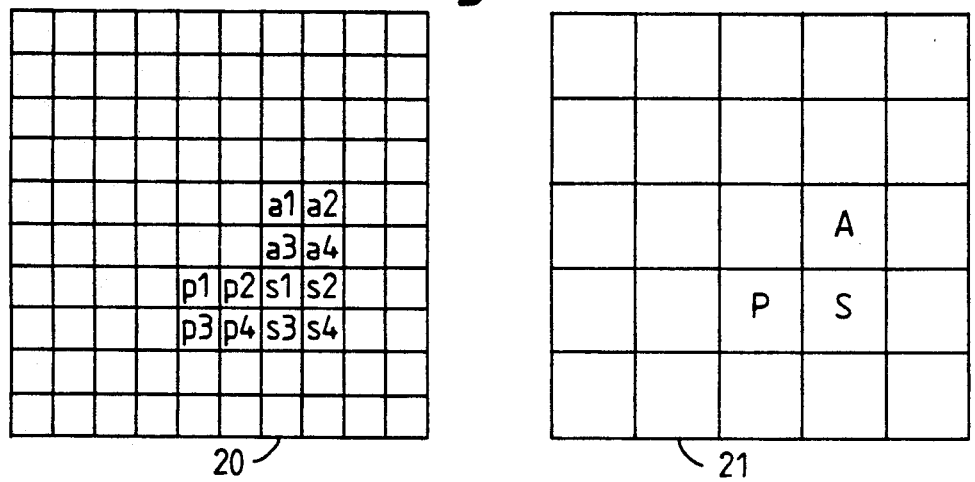
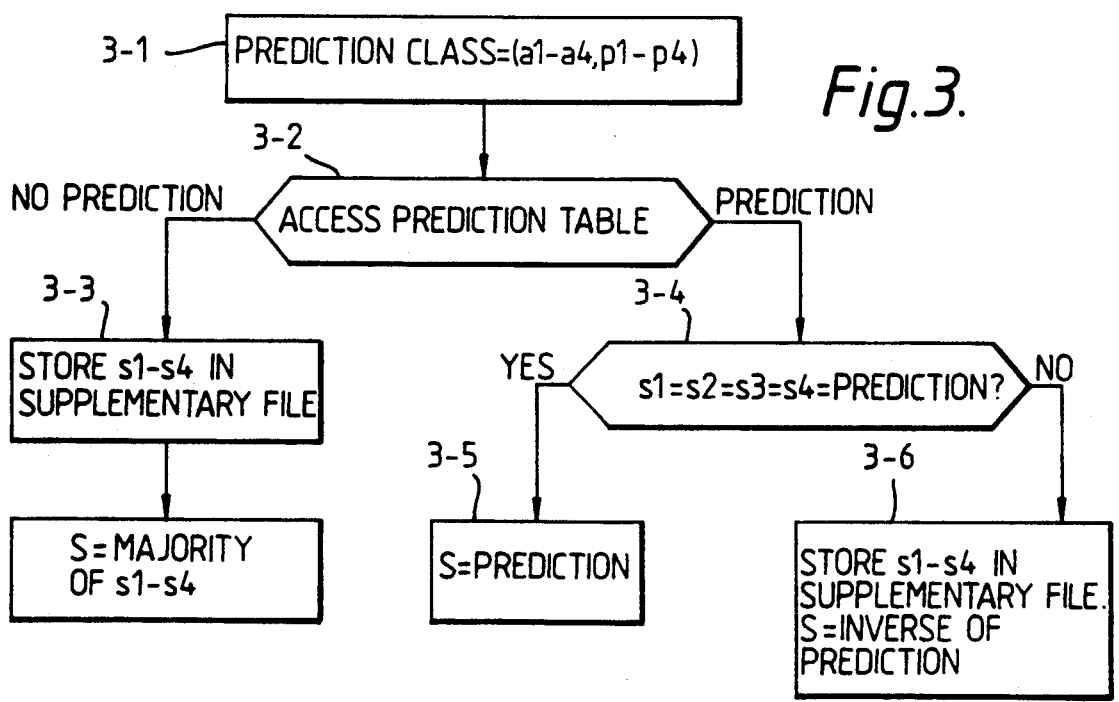

ENCODING IMAGE DATA

This application is a continuation of application Ser. No. 659,020, filed Feb. 21, 1991.

BACKGROUND TO THE INVENTION

This invention relates to a method and apparatus for encoding image data. The invention is particularly concerned with an encoding technique for image compression, for reducing the amount of memory required to store the image data, or the time required to transmit the data.

One method of compressing image data is described by C. Chamzas and D. L. Duttweiler, "Progressive encoding of facsimile images using edge decomposition (PED)", Proc. GLOBECOM 1988 pages 1011–1015, 1988. In this method, a high resolution image is converted into a low resolution image, such that each pixel (picture element) of the low resolution image corresponds to a group of the pixels in the original image (this group being referred to as a superoixel). At the same time, a supplementary file is produced, containing the information required to reconstruct the high resolution image from the low resolution image.

A characteristic of this compression technique is that it can be applied repeatedly to the image data, so as to produce progressively higher levels of compression. In other words, the compression technique is applied first to the original image data, to produce a low resolution image; the compression is then applied to this low resolution image to produce a still lower resolution image; and so on until the desired degree of compression is achieved. Decoding is achieved by reversing the process.

This progressive encoding characteristic has the advantage that, when a user requires to view the image, it is not necessary for the image to be fully decompressed before it can be viewed. The stored low resolution image can be displayed immediately, with progressively higher resolution images being displayed as the decoding proceeds, until either the maximum resolution for the display is achieved, or else the user decides that the image is not required.

The method described in the above-mentioned paper for producing a low resolution image from a high resolution image is as follows.

For each pixel S in the low resolution image, two adjacent pixel A and P are examined. If A=P, it is predicted that S will be the same colour (black or white) as both A and P. The corresponding superpixel in the high resolution image is then examined to deter,-.line whether this prediction is correct. If the prediction is correct, i.e. all the pixels in the superpixel are of the predicted colour) then S is set to the predicted colour. If the prediction is not correct, S is set to the opposite colour, and the actual bit pattern of the superpixel corresponding to S is stored in the supplementary file.

If, on the other hand, A is not equal to P, no prediction is made for S, and the actual bit pattern of the corresponding superpixel is stored in the supplementary file. S may be set to either colour in this case.

Reconstruction of the original high-resolution image can be achieved simply by reversing the above procedure.

It has been found that a problem with the above compression technique is that it tends to lead to instability in the compressed image. This can occur if a straight horizontal or vertical edge in the image runs through the middle of a row or column of superpixels, and takes the form of an oscillation between black and white pixels along that edge.

The object of the present invention is to overcome this problem.

SUMMARY OF THE INVENTION

According to the invention, there is provided a method of encoding a first image to produce a second image of lower resolution than the first image, each pixel in the second image corresponding to a superpixel group of pixels in the first image, the method comprising:

(a) scanning the superpixels of the first image in a fixed scan pattern, (b) for each superpixel in the first image, forming a prediction class value based on the values of a plurality of previously scanned pixels in the first image, (c) using the prediction class value to address a table, to access a prediction code indicating a predicted colour for the corresponding pixel in the second image, or indicating that no prediction is provided, (d) if the prediction code indicates that no prediction is provided, setting the colour of said corresponding pixel in the second image to a colour based on the colours of the pixels in the superpixel, and storing the actual pixel pattern of the superpixel in a supplementary file, (e) if the prediction code indicates that a prediction is provided, comparing the prediction with the actual pixel pattern of the superpixel, (f) if the prediction matches the actual pattern, setting the corresponding pixel in the second image to the predicted colour, and (g) if the prediction does not match the actual pattern, setting the corresponding pixel in the second image to the inverse of the predicted colour and storing the actual pattern in the supplementary file.

BRIEF DESCRIPTION OF THE DRAWINGS

FIG. 1 is an overall block diagram of an image storage and retrieval system embodying the present invention.

FIG. 2 shows parts of a high-resolution image and a low-resolution image, to illustrate the notation used in describing the image encoding method.

FIG. 3 is a flow chart of the image encoding method.

DESCRIPTION OF AN EMBODIMENT OF THE INVENTION

Figure 4:
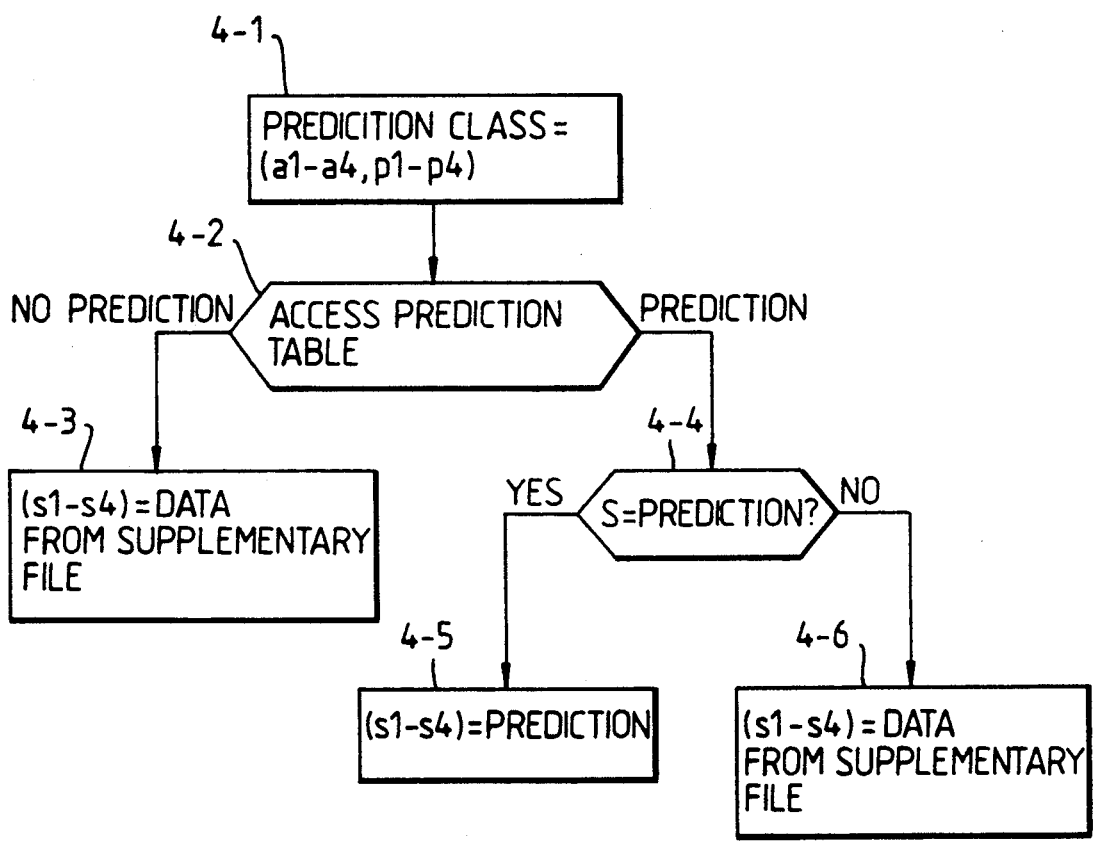
FIG. 4 is a flow chart of the corresponding image decoding method.

One image data encoding method and apparatus will now be described by way of example with reference to the accompanying drawings.

OVERVIEW OF SYSTEM

Referring to FIG. 1, this shows an overall view of the apparatus.

A document 10 is digitised by a conventional facsimile scanner 11 to produce a digitised image consisting of an array of pixels. Each pixel has the value 0 (White) or 1 (black).

The digitised image data is encoded by means of an encoder 12, so as to compress it, and the encoded data is stored in a memory 13.

When it is desired to view the image, the encoded image data is read out of the memory 13, and decompressed by a decoder 14. The decoded image is then displayed on a display unit 15.

The encoding process consists of taking an original high resolution image, and converting it into a corresponding low-resolution image. At the same time, a supplementary file is produced, containing the information required to reconstruct the high-resolution image from the low-resolution image.

Referring to FIG. 2, this illustrates the notation used in the following description of the encoding and decoding processes.

The high resolution image 20 comprises an array of pixels. These are grouped into 2×2 sub-arrays, referred to as superpixels. For example, the four pixels, s1-s4 form one superpixel.

The low-resolution image 21 also comprises an array of pixels, each of which corresponds to one of the superpixels in the high-resolution image. For example, pixel S corresponds to superpixel s1-s4.

During encoding and decoding, the images are scanned in a raster format. The low-resolution pixel currently being scanned is referred to as pixel S, the pixel above this as pixel A, and the preceding pixel (i.e. that to the left of S) as pixel P.

ENCODING

The procedure for encoding a high-resolution image to form a low-resolution image will now be described. The images are scanned in a raster pattern, so as to process each superpixel s1-s4 in the high-resolution image in turn, and to assign a colour to the corresponding pixel S in the low-resolution image. FIG. 3 shows the processing performed at each step in this scan.

(3-1) First, the two adjacent superpixels a1-a4 and p1-p4 are accessed, and are used to form an 8-bit prediction class value. (a1-a4, p1-p4). In the case where the superpixel s1-s4 is on the top or left-hand edge of the image, it is necessary to assume default values for those bits; for example, a default value 0 (white) may be assumed.

(3-2) This prediction class value (a1-a4, p1-p4) is then used as an address to access a look-up table held in RAM. The table contains 256 entries, one for each possible prediction class. Each entry contains a code representing one of the following predictions;

all-white superpixel (i.e. $s1=s2=s3=s4=0$)
    all-black superpixel (i.e. $s1=s2=s3=s4=1$)
    no prediction provided (3-3) If the accessed entry indicates that no prediction is provided then the bit pattern s1-s4 is stored in the supplementary file. The value of the corresponding pixel S in the low-resolution image is set to white if more than half of s1-s4 are white, and is otherwise set to black. In other words S is given the majority value of the pixels s1-s4, with a slight bias to black. This is found to be perceptually preferable.

(3-4) If the accessed table entry indicates that a prediction has been provided, then the actual values of the pixels s1-s4 are examined to determine whether they match the prediction.

(3-5) If the prediction is correct (i.e. $s1=s2=s3=s4=$ predicted value), then the pixel S in the low-resolution -image is set to the predicted value.

(3-6) Alternatively, if the prediction is incorrect, the pixel S is set to the inverse of the predicted value, and the bit pattern s1-s4 is stored in the supplementary file.

The above steps are repeated for each pixel in the low-resolution image, until all the pixels in this image have been assigned values.

The whole procedure can then be repeated on the low-resolution image, to form an even lower resolution image, and so on until the desired degree of compression is achieved, or until further repetitions produce no significant increase in compression.

The result of the above procedure is a low-resolution image, and a supplementary file consisting of information required to reconstruct the high-resolution image. Where there has been more than one level of compression, there will be a separate supplementary file for each level.

The low resolution image may be stored simply as a pattern of bits, without any further encoding. The supplementary file is preferably stored in an encoded form, e.g. using a conventional Huffman code, so as to compress it further. Details of this further coding form no part of the present invention and so need not be described in further detail.

The look-up table used in step 3-2 above is constructed as follows.

First, a typical sample set of documents is digitised, to produce a set of training data. Each superpixel s1-s4 in this training data is then scanned in turn, and its prediction class (a1-a4, p1-p4) is determined. A frequency table is constructed, indicating for each of the 256 possible prediction classes the frequency of occurrence of each of the 16 possible bit patterns of the superpixel s1-s4. This data is then normalised so as to calculate, for each prediction class, the probabilities of an all-white superpixel ($s1=s2=s3=s4=0$) and of an all-black superpixel ($s1=s2=s3=s4=1$). This is done for each prediction class, by dividing the frequency of occurrence of each of these two patterns in that prediction class by the total number of occurrences of that prediction class. If either of these probabilities is greater than a predetermined threshold value (e.g. 0.6) then the appropriate prediction is written into the look-up table entry for that prediction class. Otherwise, the look-up table entry is set to indicate that no prediction is possible.

Preferably, a separate look-up table is compiled for each level of the multi-level encoding procedure. This is done by encoding the training data at each level, using the look-up table that has just been compiled for that level, and then analysing the resulting compressed image data to compile the look-up table for the next level. A different threshold probability may be used for each level so as to optimise the encoding.

DECODING

The procedure for reconstructing a high-resolution image from a low-resolution image and its associated supplementary file data will now be described with reference to FIG. 4. The procedure shown is performed for each pixel S in turn in the low-resolution image, and calculates the bit pattern s1-s4 for the corresponding superpixel in the high-resolution image.

(4-1) The prediction class for S is derived from the bit pattern a1-a4, p1-p4 in the two adjacent superpixels. If S is on the top or left-hand edge of the image, default values are assumed for these bits. It should be noted that, when S is being processed, the pixels A and P will already have been processed (since they occur before S in the raster scan pattern) and hence the bit patterns for the corresponding superpixels will already have been calculated, or given default values.

(4-2) The prediction class is then used to access the look-up table, to obtain the prediction for this pixel S.

(4-3) If the table indicates that no prediction is provided, then data is read out of the supplementary file and used to reconstruct the superpixel s1-s4 in the high-resolution image.

(4-4) If, on the other hand, the table indicates a prediction is provided, the prediction is compared with the actual value of S.

(4-5) If the prediction matches the actual value of S, the corresponding superpixel s1-s4 in the high-resolution image is set to all-black or all-white, according to the prediction.

(4-6) If the prediction does not match the actual value of S, data is read out of the supplementary file and used to reconstruct the superpixel s1-s4 in the high-resolution image.

The above steps are repeated for each pixel in the low-resolution image so that all the superpixels in the high-resolution image are reconstructed.

The whole procedure can be repeated, to reconstruct an even higher-level image and so on, until either the highest level image is produced, or else the user decides to terminate the process.

CONCLUSION

It will be appreciated that many modifications can be made to the method described above without departing from the spirit and scope of the present invention.

For example, although in the encoding method described above the prediction class value is based on the pixels a1-a4, p1-p4 in the "above" and "preceding" superpixels, in other embodiments of the invention a different set of pixels may be used to form the prediction class value.

We claim:

1. A method of encoding a first image to produce a second image of lower resolution than the first image each pixel in the second image corresponding to a superpixel group of pixels in the first image, the method comprising storing a table comprising a plurality of entries some of said entries containing prediction codes indicating a predicted pixel colour and others of said entries containing a code indicating that no prediction is provided, the method further comprising the steps:
   (a) scanning the superpixels of the first image in a fixed scan pattern,
   (b) for each superpixel in the first image, using values of a plurality of previously scanned pixels in the first image to form an address value,
   (c) using the address value to address said table, to access an entry from said table,
   (d) if said entry contains said code indicating that no prediction is provided, setting the colour of said corresponding pixel in the second image to a colour based on the colours of the pixels in the superpixel, and storing the actual pixel pattern of the superpixel in a supplementary file,
   (e) if said entry contains a prediction code, comparing the prediction provided by said prediction code with the actual pixel pattern of the superpixel,
   (f) if the prediction matches the actual pattern, setting the corresponding pixel in the second image to the predicted colour, and
   (g) if the prediction does not match the actual pattern, setting the corresponding pixel in the second image to the inverse of the predicted colour and storing the actual pattern in said supplementary file.

2. A method of encoding an image comprising applying the method of claim 1 repeatedly so as to form a series of images of progressively lower resolution.

3. A method according to claim 2, wherein a separate table is used for each repetition.

4. A method according to claim 1 wherein said table is formed by performing an analysis on a set of sample images, to determine the most probable prediction for each prediction class value.

5. A method according to claim 4 wherein a prediction code is entered in said table when the probability of said most probable prediction for a particular prediction class value exceeds a predetermined threshold value.

6. A method of decoding a first image to produce a second image of higher resolution than the first image, each pixel in the first image corresponding to a superpixel group of pixels in the second image, the method comprising storing a table containing a plurality of entries some of said entries containing prediction codes indicating a predicted pixel colour and others of said entries containing a code indicating that no prediction is provided, the method further comprising the steps:
   (a) scanning the pixels of the first image in a fixed scan pattern,
   (b) for each pixel in the first image, using values of a plurality of pixels in the second image to form an address value,
   (c) using the address value to address a table, to access an entry from said table,
   (d) if said entry contains said code indicating that no prediction is provided, using data from a supplementary file to set the colours of the pixels in said superpixel,
   (e) if said entry contains a prediction code, comparing the prediction provided by said prediction code with the actual value of the pixel in the first image,
   (f) if the prediction matches the value of said pixel, setting each pixel in the corresponding superpixel in the second image to the predicted colour, and
   (g) if the prediction does not match the actual pattern, using data from the supplementary file to set the colours of the pixels in said superpixel.

* * * * *